United States Patent [19]
Hatakeyama et al.

[11] Patent Number: 6,016,370
[45] Date of Patent: Jan. 18, 2000

[54] IMAGE DATA PROCESSING APPARATUS HAVING PIXEL QUANTITY CONVERSION AND ERROR DIFFUSION FUNCTIONS

[75] Inventors: Mitsuaki Hatakeyama; Kenichi Ohkubo, both of Gifu-ken, Japan

[73] Assignee: Sanyo Electric Co., Ltd., Osaka, Japan

[21] Appl. No.: 08/889,720

[22] Filed: Jul. 8, 1997

[30] Foreign Application Priority Data

| Jul. 9, 1996 | [JP] | Japan | ................................ 8-179461 |
| Jul. 12, 1996 | [JP] | Japan | ................................ 8-183360 |

[51] Int. Cl.$^7$ ........................................................ G06K 9/32
[52] U.S. Cl. ........................ 382/299; 382/252; 358/448; 358/456
[58] Field of Search .................................. 382/299, 232, 382/252, 254; 358/447, 448, 455, 456

[56] References Cited

U.S. PATENT DOCUMENTS 5,727,086 3/1998 Yoshida ................................ 382/232
5,764,816 6/1998 Kohno et al. ........................ 382/299

*Primary Examiner*—Thomas D. Lee
*Attorney, Agent, or Firm*—Sherdian Ross P.C.

[57] ABSTRACT

An image data processing apparatus is described that prevents the quality of image data from being degraded by pixel quantity conversion. The apparatus includes an analog processor, a quantity converter and a binarization converter. The analog processor quantizes each of the analog element data to generate multiple-state element data. The quantity converter changes the number of plural pieces of multiple-state element data in one line to generate quantity-converted element data. The quantity converter averages at least two adjacent pieces of multiple-state element data to generate an average value as one piece of new multiple-state element data. The quantity converter further selectively outputs the new multiple-state element data and original multiple-state element data as the quantity-converted element data. The binarization converter binarizes the quantity-converted element data to generate binary element data.

7 Claims, 11 Drawing Sheets

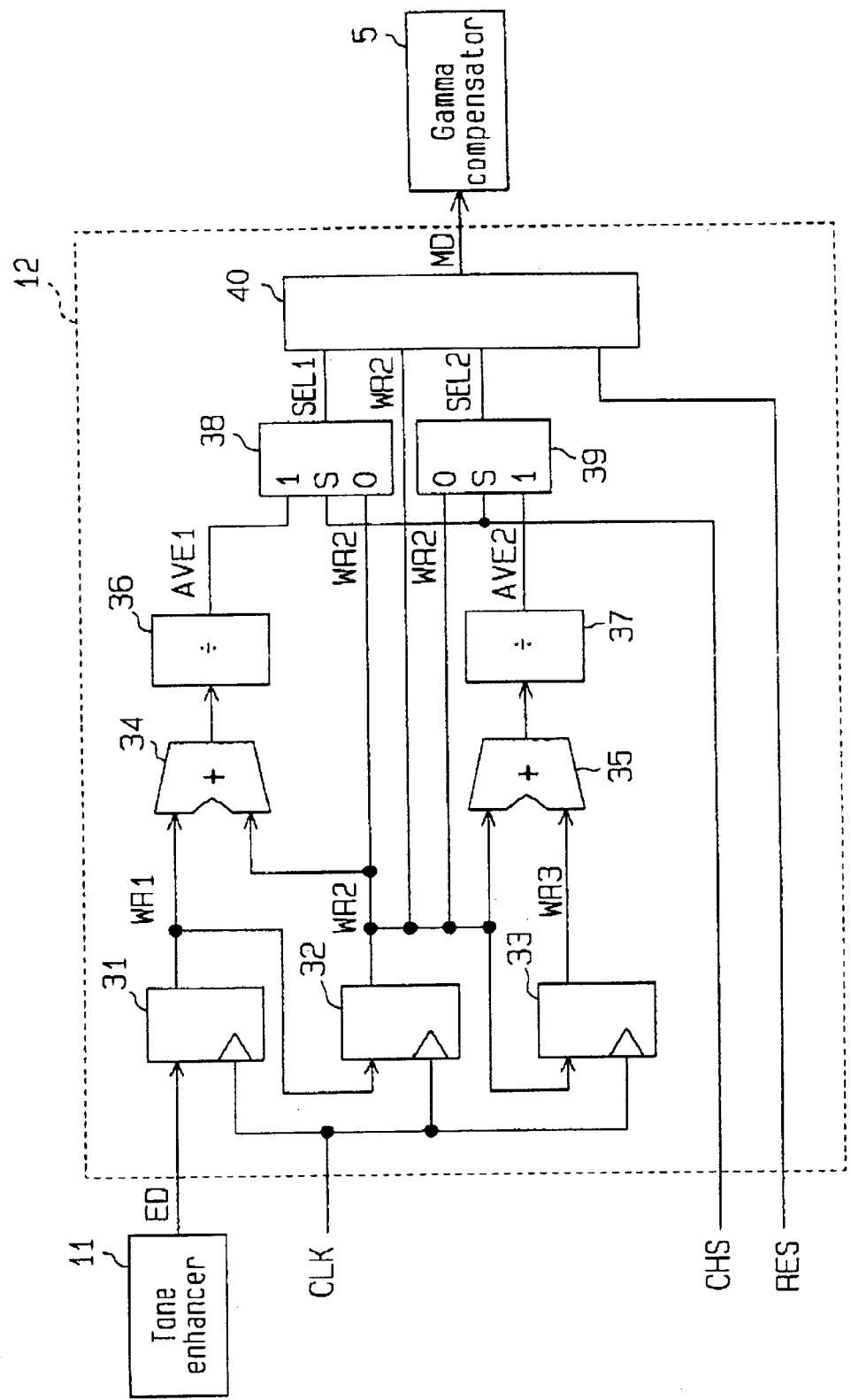

Fig.4

| Limit condition | Determination | LIM | |
|---|---|---|---|
| ×2 enhancement (defference equal to or greater than −128 and less than 128) ×4 enhancement (defference equal to or greater than −64 and less than 64) | No limit | 0 | 0 |
| ×2 enhancement (defference equal to or greater than 128) ×4 enhancement (defference equal to or greater than 64) | FF limit | 0 | 1 |
| ×2 enhancement (defference less than −128) ×4 enhancement (defference less than −64) | 0 limit | 1 | 0 |

Fig.5

| Function | MF | | Shifting |
|---|---|---|---|
| ×0 enhancement | 0 | 0 | 0H |
| ×1 enhancement | 0 | 1 | Through |
| ×2 enhancement | 1 | 0 | Shift 1 bit upward |
| ×4 enhancement | 1 | 1 | Shift 2 bits upward |

Fig.6

| Function | RES | | | MD |
|---|---|---|---|---|
| 1/1 | 0 | 0 | 0 | WR2 |
| 1/2 | 0 | 0 | 1 | SEL1 |
| 2/3 | 0 | 1 | 0 | SEL1 |
| 3/2 | 0 | 1 | 1 | SEL2 |
| 2/1 | 1 | 0 | 0 | SEL2 |

Main scanning direction →

NO conversion

1/2 conversion

2/3 conversion

3/2 conversion

2/1 conversion

IMAGE DATA PROCESSING APPARATUS HAVING PIXEL QUANTITY CONVERSION AND ERROR DIFFUSION FUNCTIONS

BACKGROUND OF THE INVENTION

1. Field of the Invention

The present invention relates to an image data processing apparatus, and, more particularly, to an image data processing apparatus that performs pixel quantity conversion and error diffusion processings on image data.

2. Description of the Related Art

Information machines, such as facsimile machines, copying machines and optical code readers (OCR), each comprise a line sensor like a charge coupled device (CCD) or a contact type sensor and an image data processing apparatus connected to the line sensor. The processing apparatus receives an analog image signal supplied from the line sensor and converts that signal to binary image data. A modem installed in a facsimile machine sends such binary image data to a destination facsimnile machine. A copying machine prints binary imaged data on a printer. An OCR sends out binary image data to a computer.

To increase the data transfer speed in facsimile machines, image data having a relatively low pixel quantity (e.g., 200 dpi) is used. To improve the image quality in copying machines, image data having a relatively high pixel quantity (e.g., 400 dpi) is used.

There are information machines, which have a communication function and a printer function, are connected to a computer. An image data processing apparatus incorporated in such an information machine is configured to convert the pixel quantity of data in accordance with a communications device, a printer or a computer, when the pixel quantity of the line sensor (e.g., 300 dpi) is lower than the pixel quantity of a printer (e.g., 400 dpi), the image data processing apparatus converts the pixel quantity of data to match the pixel quantity of the printer to prevent the printed image from being reduced. In the case of a copying machine, for example, the processing apparatus outputs binary data of the same pixel two by two so that the number of pixels is doubled to provide a high pixel quantity, Successively outputting two same pixel data however makes printed characters thicker. Thicker characters are harder to see.

The computer supplies image data having a relatively high pixel quantity (e.g., 800 dpi) to the processing apparatus, In the case of outputting such image data onto a printer, binary data is thinned every other pixel in order to halve the number of pixels, thus ensuring a low pixel quantity. This technique however may change the width of a printed line and may make a thin line disappear. As one example, when the binary data of the single center pixel of a line consisting of three pixels is thinned, that line is printed as a line consisting of two pixels. When the binary data of both side pixels of a line consisting of three pixels is thinned, that line is printed as a line consisting of one pixel. As another example, a line consisting of one pixel may disappear when thinned.

An error diffusion method is employed to naturally display a multi gradation image using a binary display system or binary (white and black) printing system with high quality. The error diffusion method is known as a high-performance pseudo gradation processing technique. The error diffusion method miacroscopically expresses the gradation by computing a difference or error value between pixel data and a predetermined threshold value and adding or subtracting the error value to or from pixel data of those pixels around the pixel to be displayed. The threshold value is predetermined to determine the on/off (white/black) of the display and printing, The error value is computed for each pixel data in one line and is temporarily stored. The error value is added to or-subtracted from pixel data of the corresponding pixel in the next line and pixel data of those pixels around that pixel. The image data resulting from the addition or subtraction is compared with a threshold value to determine if it is white or black.

Pixel quantity conversion is carried out prior to the error diffusion process. Therefore, the error diffusion process uses individual pixel data that have been generated by the pixel quantity conversion. when image data having a relatively high pixel quantity is generated by the pixel quantity conversion, it is necessary to store a greater amount of error values data than image data that has not undergone pixel quantity conversion. This requires a large-capacity memory and inevitably enlarges the apparatus.

SUMMARY OF THE INVENTION

Broadly speaking, the present invention relates to an image data processing apparatus which prevents the quality of image data from being degraded by pixel quantity conversion.

The invention also relates to an image data processing apparatus which prevents the memory capacity needed for an error diffusion process from being increased by pixal quantity conversion. The present invention can be implemented in numerous ways including as an apparatus and a method.

One aspect of the invention pertains to an apparatus for processing image data corresponding to one screen. The image data consists of a plurality of lines, each including plural pieces of consecutive analog element data. The apparatus includes an analog processor, a quantity converter and d binarization converter. The analog processor quantizes each of the analog element data to generate multiple-state element data. The quantity converter successively receives plural pieces of the multiple-state element data from the analog processor and changes the number of plural pieces of multiple-state element data in one line to generate quantity-converted element data. The quantity convertor averages at least two adjacent pieces of multiple-state element data to generate an average value as one piece of new multiple-state element data. The quantity converter further selectively outputs the new multiple-state element data and original multiple-state element data as the quantity-converted element data. The binarization converter receives the quantity-converted element data and binarizes the quantity-converted element data to generate binary element data.

Another aspect of the invention pertains to an apparatus for processing image data corresponding to one screen. The image data consists of a plurality of lines, each including plural pieces of consecutive analog element data. The apparatus includes an analog processor, a tone enhancer, a quantity converter and a binarization converter. The analog processor quantizes each of the analog element data to generate multiple-state element data. The tone enhancer successively receives plural pieces of multiple-state element data from the analog processor and enhances a tone between plural pieces of multiple-state element data in one line. The tone enhancer computes a difference between specific multiple-state element data in one line and at least one multiple-state element data adjacent to the specific multiple-state element data. The tone enhancer further adds the difference to the specific multiple-state element data to generate tone-enhanced element data. The quantity converter successively receives plural pieces of tone-enhanced element data from the tone enhancer and changes the number of plural pieces of tone-enhanced element data in one line to generate quantity-converted element data. The quantity converter averages at least two adjacent pieces of tone-enhanced element date to generate an average value as one piece of new multiple-state element data. The quantity converter further selectively outputs the new multiple-state element data and original tone-enhanced element data as the quantity-converted element data. The binarization converter receives the quantity-converted element data and binarizes the quantity-converted element data to generate binary element data.

Yet another aspect of the invention pertains to an apparatus for processing image data corresponding one screen. The image data consists of a plurality of lines, each including plural pieces of consecutive analog element data. The apparatus includes an analog processor, a quantity converter, a halftone circuit and a memory. The analog processor quantizes each of the analog element data to generate multiple-state element date. The quantity converter successively receives plural pieces of the multiple-state element data from the analog processor and changes the number of plural pieces of multiple-state element data in one line to generate quantity-converted element data. The quantity converter averages at least two adjacent pieces of multiple-state element data to generate an average value as one piece of new multiple-state element data. The quantity converter further selectively outputs the new multiple-state element data and original multiple-state element data as the quantity-converted element data. The halftone circuit successively receives plural pieces of quantity-converted element data and computes an error value between each of the plural pieces of quantity-converted element data in a current line and a first predetermined threshold value. The halftone circuit averages error values for at least two adjacent pieces of quantity-converted element data to generate an average error value. The memory is connected to the halftone circuit. The memory receives the average error value as an error value for one piece of quantity-converted element data and stores the average error value in a line by line manner. The halftone circuit adds the average error value stored in the memory to at least one associated piece of quantity-converted element data in a next line to generate an addition result. The halftone circuit further compares the addition result with a second predetermined threshold value to generate binary element data.

Other aspects and advantages of the invention will become apparent from the following description, taken in conjunction with the accompanying drawings, illustrating by way of example the principals of the invention.

BRIEF DESCRIPTION OF THE DRAWINGS

The invention, together with objects and advantages thereof, may best be understood by reference to the following description of the presently preferred embodiments together with the accompanying drawings in which:

FIG. 3 is a circuit diagram showing a pixel quantity converter provided in that apparatus in FIG. 1;

FIG. 4 is a digram depicting the structure of a signal used in a limit process of a signal in the tone enhancer in FIG. 2;

FIG. 5 is a diagram showing the structure of a signal used in an enhancement process by the tone enhancer in FIG. 2;

FIG. 6 is a diagram showing the structure of a signal used in a conversion process by the pixel quantity converter in FIG. 3;

DETAILED DESCRIPTION OF THE PREFERRED EMBODIMENTS

Figure 1:
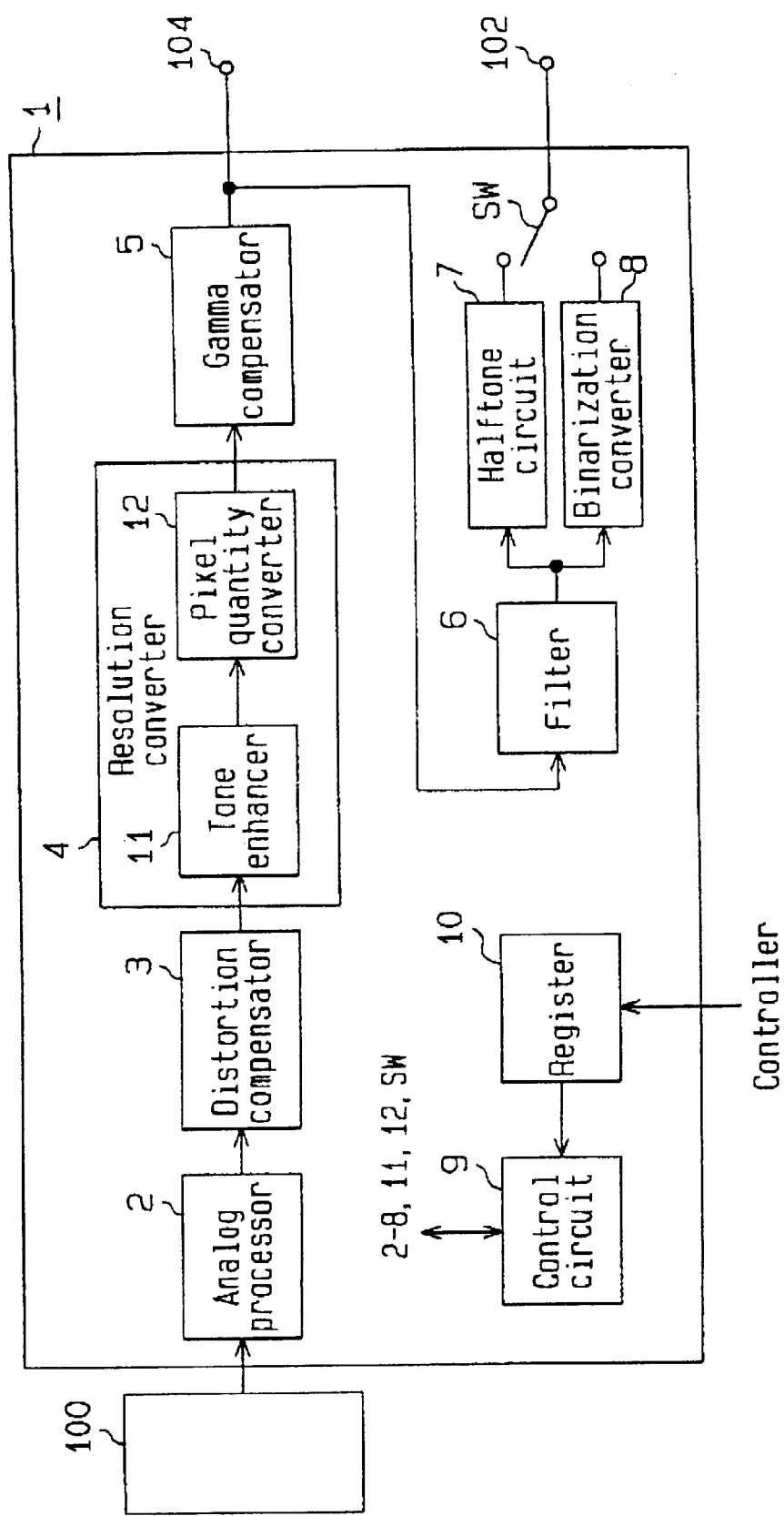
FIG. 1 is a block diagram illustrating an image data processing apparatus according to the first embodiment of the invention.

An image data processing apparatus according to a first embodiment of the invention will now be described referring to the accompanying drawings. As shown in FIG. 1, an image data processing apparatus 1 is installed in an information machine (not shown), which is connected to a personal computer. The image data processing apparatus 1, connected to a line sensor 100 like a CCD or contact type image sensor and receives an analog image signal from the line sensor 100 to generate binary image data. The processing apparatus 1 further performs analog-to-digital (AD) conversion on the analog image signal to yield digital gradation data. The processing apparatus 1 has a first output terminal 102 for supplying binary image data to the facsimile or copy processes and a second output terminal 104 for supplying digital gradation data to the personal computer.

The image data processing apparatus 1 includes an analog processor 2, a distortion compensator 3, a resolution converter 4, a gamma compensator 5, a filter 6, a halftone circuit 7, a binarization converter 8, a control circuit 9 and a register 10. Those circuits are integrated on a single chip semiconductor circuit.

Figure 8:
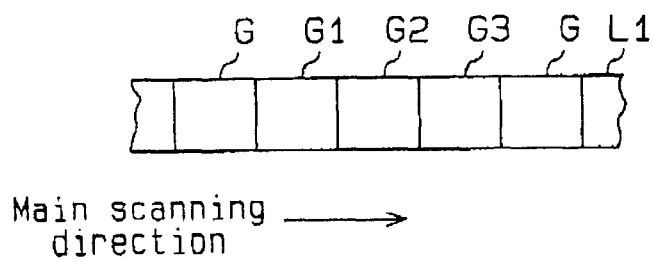
FIG. 8 is a diagram of pixel data read by an image sensor.

The line sensor 100 includes a plurality of pixels for scanning the original, Au shown in FIG. 8, one line of image data L1 scanned along the main scanning direction includes plural pieces of pixel data G. The line sensor 100 generates an analog image signal having a voltage according to the quantity of the original, for each pixel in a line by line manner. When a pixel receives reflected light corresponding to a black color, for example, an analog image signal having a high voltage is generated. In the case of a white color, an analog image signal having a low voltage is generated. In the case of a gray color, an analog image signal having an intermediate voltage is generated. The analog processor 2 receives the analog image signal from the line sensor 100. The analog processor 2 includes an A/D converter configured to deal with a predetermined number of bits (e.g., eight bits). The A/D converter quantizes the analog image signal to generate digital gradation data (256 gradations in this case) or multiple state data. The gradation data has a voltage that is substantially proportional to the intensity of the reflected light each pixel receives.

The distortion compensator 3 receives the digital gradation data from the analog processor 2 in a line by line manner. The distortion compensator 3 has a memory (not shown) where distortion compensation data (shading data) has previously been stored. The distortion compensator 3 reads the distortion compensation data from the memory and executes gradation compensation on one line of gradation data using this distortion compensation data. The distortion compensation data is used to numerically compensate for the distortion that has occurred in the optical system.

The resolution converter 4 is configured to receive the compensated digital gradation data from the distortion compensator 3 and carry out a tone enhancement process for enhancing the tone of each gradation data and a process for converting the pixel quantity. The resolution converter 4 includes a tone enhancer 11 and a pixel quantity converter 12. The tone enhancer 11 receives the gradation data compensated by the distortion compensator 3. The enhancer 11 performs the tone enhancement process using the digital gradation data corresponding to a plurality of pixels that are arranged along the main scanning direction. According to the first embodiment, the enhancer 11 temporarily holds gradation data corresponding to three pixels and performs the tone enhancement process using the gradation data of three pixels. That is, the tone enhancer 11 executes the tone enhancement process on each group of gradation data corresponding to three pixels G1, G2 and G3.

The tone enhancer 11 performs the tone enhancement process on the center pixel G2 among the three consecutive pixels G1 to G3 along the main scanning direction. The enhancer 11 computes the average of the tone values of the two pixels G1 and G3 adjacent to the center pixel G2 and calculates the difference between the average tone value and the tone value of the center pixel G2. The value of the difference is used as a linear derivative coefficient. The enhancer 11 multiplies the linear derivative coefficient by a predetermined tone enhancement level and adds the multiplication result to the gradation data corresponding to the center pixel G2. The result of the addition is used as new digital gradation data of the center pixel G2, which has undergone the tone enhancement process.

The above-discussed tone enhancement process is carried out according to the following equations (1) and (2). Given that the digital gradation data corresponding to the center pixel G2 and its adjoining pixels G1 and G3 are D0, D1 and D2, respectively. The linear derivative coefficient K1 is acquired from the equation (1).

$$K1=D0-(D1+D2)/2 \quad (1)$$

Figure 9:
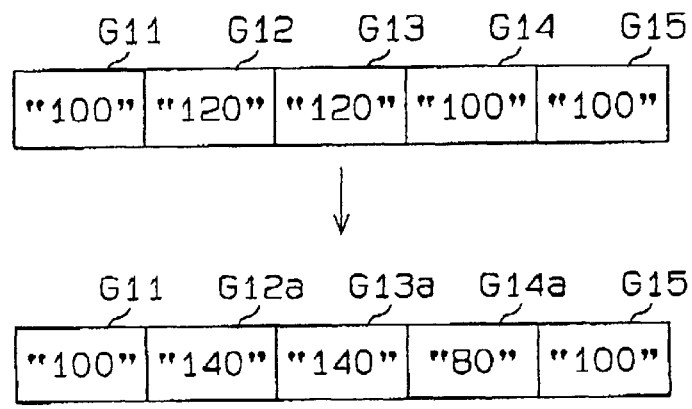
FIG. 9 is a diagram illustrating the enhancement process by the tune enhancer in FIG. 2.

New gradation data DX of the center pixel G2 is acquired from the equation (2).

$$DX=D0+K2 \times K1 \quad (2)$$

where K2 is the enhancement level,

Suppose that gradation data "100", "120", "120", "100" and "100" of five pixels G11 to G15 along the main scanning direction have been generated as shown in FIG. 9. Also assume that the enhancement level K2 is set to "2". The tone enhancer 11 first generates new gradation data "140", using the gradation data "120" of the center pixel G12 among the gradation data of the pixels G11 to G13. The enhancer 11 then generates new gradation data "140" using the gradation data "120" of the center pixel G13 among the gradation data of the pixels G12 to G14. The enhancer 11 further generates new gradation data "80" using the gradation data "100" of the center pixel G14 among the gradation data of the pixels G13 to G15. Therefore, the difference between the gradation data of the pixels G12 and G13 and the gradation data of the pixel G14 after the tone enhancement process is greater than the difference before the tone enhancement process. The densities of the pixels Gl2–Gl4 are enhanced in this manner.

The tone enhancer 11 may perform the tone enhancement process using the gradation data of the center pixel and the gradation data of a plurality of consecutive pixels around the center pixel. The tone enhancement process may also be executed using the gradation data of pixels adjacent to the center pixel along the sub scanning direction. The tone enhancement process may be executed using a combination of adjoining pixels along the main scanning direction and adjoining pixels along the sub scanning direction. Furthermore, the difference between the gradation data of the center pixel and the gradation data of one adjoining pixel around the center pixel may be added to the gradation data of the center pixel.

The pixel quantity converter 12 receives the processed digital gradation data from the tone enhancer 11. The converter 12 is configured to compute an average value of digital gradation data corresponding to two pixels adjoining along the main scanning direction. The converter 12 is also configured to increase or decrease the number of pieces of gradation data in one line in accordance with a predetermined conversion ratio using the computed average value as one digital gradation data corresponding to one pixel. In other words, the converter 12 is configured to switch the pixel quantity from one to another in accordance with control data stored in the register 10. According to the embodiment, the conversion ratio can be selectively sat to one of "1/1-fold", "1/2-fold", "2/3-fold", "3/2-fold" and "2/1-fold".

Figure 10A:
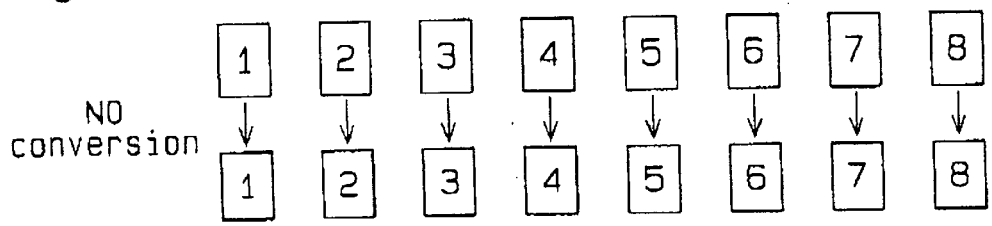
FIGS. 10A through 10E are diagrams illustrating the conversion process by the pixel quantity converter in FIG. 3.
Figure 10B:
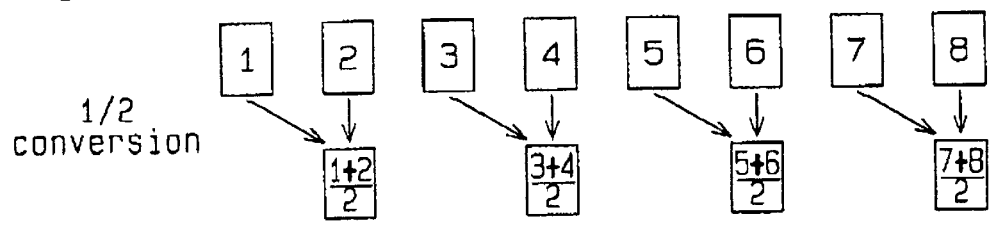

As shown in FIG. 10B, for example, the average value is computed with adjoining two pixels as one group. This average value is output as new gradation data corresponding to one pixel. Accordingly, the gradation data of two pixels is replaced with the new gradation data ot one pixel. The pixel quantity is thus converted to be the "1/2-fold".

Figure 10C:
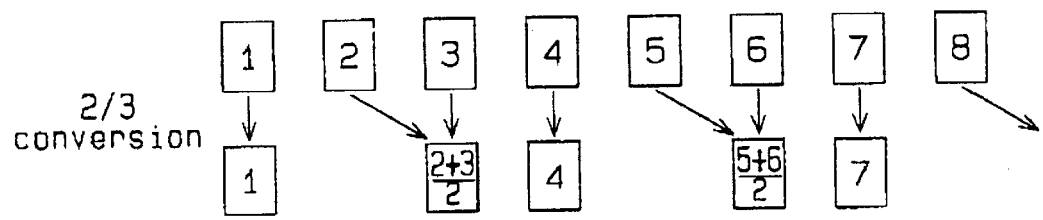

As shown in FIG. 10C, the average value is computed using pixel pairs, wile skipping one pixel in between the pairs, as one group. The gradation data of the skipped pixel and the average value (the gradation data of a single pixel) are alternately output. That is, the average value is inserted in a series of the gradation data of the skipped pixel. Accordingly, the gradation data of three pixels is replaced with the new gradation data of two pixels. The pixel quantity is thus converted to be the "2/3-fold".

Figure 10D:
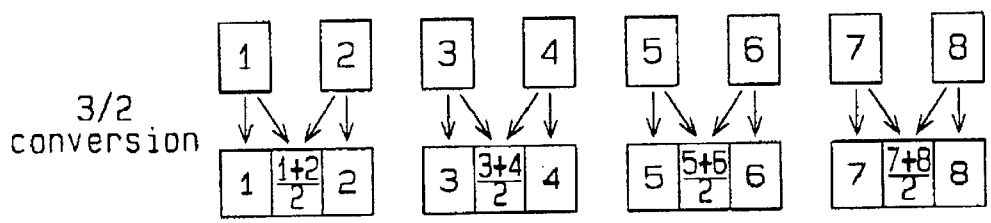

As shown in FIG. 10D, the average value is computed with two adjoining pixels as one group. The gradation data of the two adjacent pixels and the computed average value (the gradation data of a single pixel) are output. At this time, the average value is placed between the gradation data of the two adjacent pixels. That is, the average value is inserted in a group of the gradation data of the two adjacent pixels. Accordingly, the gradation data of two pixels is replaced with the new gradation data of three pixels. The pixel quantity is thus converted to be the "3/2-fold".

Figure 10E:
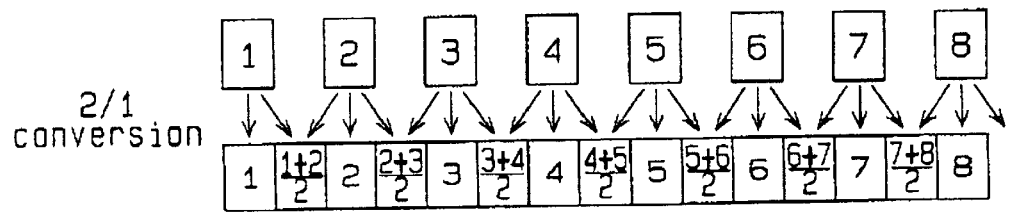

As shown in FIG. 10E, the average value is computed with two adjoining pixels as one group. At this time, two adjacent groups share a single pixel. Therefore, two average values are calculated for three pixels. The gradation data of each pixel and each average value (the gradation data of a single pixel) are alternately output. In other words, the average-value is inserted in the gradation data of two adjacent pixels, Accordingly, the gradation data of two pixels is replaced with the new gradation data of four pixels. The pixel quantity is thus converted to be the "2/1-fold". FIG. 10A exemplifies the case where the pixel quantity is converted to be the "1/1-fold".

Referring again to FIG. 1, the gamma compensator 5 receives the gradation data, which has undergone the pixel quantity conversion, from the converter 12 in a line by line manner. The gamma compensator 5 has a memory (not shown) where gamma compensation data has previously been stored. The compensator 5 performs gamma compensation on the gradation data using the gamma compensation data. The gamma compensation data is used to compensate for a deviation between the photoelectric conversion characteristic of the line sensor 100 and a visual change in the intensity of light. The gamma compensator 5 sends the gamma-compensated gradation data to the filter 6 and the second output terminal 104 in a line by line manner.

The filter 6 has a memory (not shown) capable of storing at least two lines of gradation data. The filter 6 forms a two-dimensional spatial filter with the two lines of gradation data and a matrix of 3×3 with respect to one line of gradation data supplied trom the gamma compensator 5. The spatial filter performs a filtering process on the gradation data to enhance the edge. The structure of the spatial filter is basically the same as that of the tone enhancer 11. The filter 6 sends out the filtered gradation data to the halftone circuit 7 or the binarization converter 8.

The binarization converter 8 receives the gradation data from the filter 6 and converts the gradation data to binary data using a predetermined threshold value. For example, gradation data having a value greater than the threshold value is converted to binary data of "1" and gradation data having a value smaller than the threshold value is converted to binary data of "0". The binary data "0" corresponds to white and the binary date "1" corresponds to black.

The halftone circuit 7 receives the gradation data from the filter 6 and performs an error diffusion process on the gradation data to yield binary data representing a halftone, macroscopically. It is known to those skilled in the art that the error diffusion process computes the difference or error value between the gradation data of a pixel to be displayed and a predetermined threshold value and adds or subtracts the error value to or from the gradation data of pixels around the pixel to be displayed. The gradation data that has undergone the addition-or subtraction of the error value is compared with the predetermined threshold value to be converted to binary data.

The halftone circuit 7 and the binarization converter 8 are connected via a switch SW to the first output terminal 102. The switch SW servos to selectively supply the binary data from the halftone circuit 7 or the binary data from the binarization converter 8 to the first output terminal 102. The switching operation of the switch SW is controlled by the control circuit 9 in accordance with the state of an image area.

When an original includes a character area and a photograph area, the control circuit 9 controls the switch SW as follows. The switch SW is switched to the binarization converter 8 so that binary data corresponding to the character area is sent to the first output terminal 102 from the binarization converter 8. This control provides binary data representing a distinct edge. The switch SW is also switched to the halftone circuit 7 so that binary data corresponding to the photograph area is sent to the first output terminal 102 from the halftone circuit 7. This control provides binary data representing a halftone.

The register 10 stores various kinds of data for the pixel quantity conversion and control, which are supplied from a controller (not shown). The controller, incorporated in the information machine, controls the general operation for facsimile communications, copying and so forth, The control circuit 9 receives various kinds of data stored in the register 10 and sends control signals to the individual circuits 2 to 8 based on those data.

According to the first embodiment, the pixel quantity converter 12 converts the pixel quantity at the stage of gradation data. The first embodiment therefore differs from the prior art, which executes the pixel quantity conversion at the stage of binary date. This feature can prevent characters from becoming thicker or thin lines from disappearing. This provides users with image data that is easy to see. The resolution converter 4 in the first embodiment may comprise only the pixel quantity converter 12. This structure ensures pixel quantity conversion while keeping a halftone.

Figure 2:
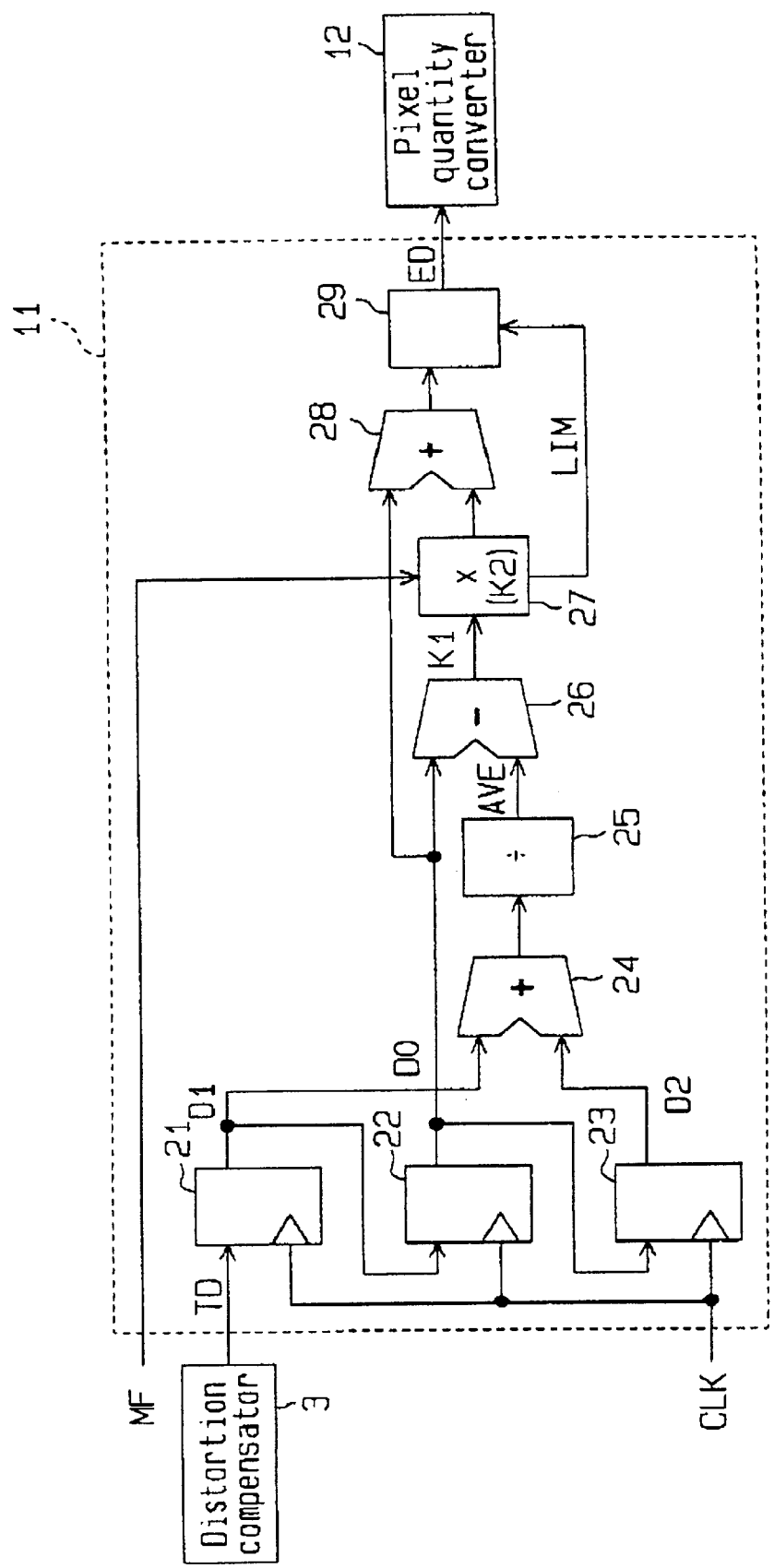
FIG. 2 is a circuit diagram showing a tone enhancer provided in that apparatus in FIG. 1.

The details of the tone enhancer 11 and the pixel quantity converter 12 will be discussed with reference to the accompanying drawings. As shown in FIG. 2, the tone enhancer 11 receives gradation data TD of individual pixels pixel by pixel and also receives a clock signal CLK and an enhancement signal MF, The clock signal CLK synchronizes with the timing at which the gradation data TD is input to the enhancer 11. The enhancement signal MF is amsociated with the enhancement level of gradation data. As shown in FIG. 5, no tone enhancement or "x 0 enhancement" is set to "00", one fold tone enhancement or "x 1 enhancement" to "01", double tone enhancement or "x 2 enhancement" to "10" and quadruple tone enhancement or "x 4 enhancement" to "11".

Referring again to FIG. 2, the tone enhancer 11 includes three registers 21, 22 and 23, an adder 24, a is divider 25, a subtracter 26, a multiplier 27, an adder 28 and a limiter 29. Each of the registers 21–23 is comprised of a multi bit-configured flip-flop circuit, and stores one pixel of gradation data TD. The registers 21–23 are connected in series. The register 21 receives the gradation data TD from the distortion compensator 3. In response to the clock signal CLK, each register 21, 22 or 23 receives the gradation data TD, temporarily holds the data and outputs the retained gradation data. Accordingly, the registers 21–23 retain the gradation data of three consecutive pixels. The register 22 outputs gradation data D0 of the center pixel, which will be subjected to the tone enhancement process. The registers 21 and 23 respectively output gradation data D1 and D2 of two pixels adjacent to the center pixel on both sides.

The adder 24 receives the gradation data D1 from the register 21 and the gradation data D2 from the register 23 and adds both gradation data D1 and D2 together. The divider 25 receives the result of the addition from the adder 24 and performs division in such a way that the added result becomes halved. The divider 25 uses a shift register, which shifts data of the addition result one bit toward lower bits for division.

The subtracter 26 receives data AVE indicative of the divisional result from the divider 25 and the gradation data D0 from the register 22, subtracts the date AVE from the gradation data D0 and sends the subtraction result to the multiplier 27. Therefore, the subtracter 26 computes the difference between the gradation data of the center pixel and the average of the gradation data of its two adjacent pixels, or the linear derivative coefficient K1 in the equation (1).

The multiplier 27 receives the linear derivative coefficient K1 from the subtracter 26 and multiplies the linear derivative coefficient K1 by an enhancement level K2. The multiplier 27 uses a shift register, which shifts the linear derivetivre coefficient K1 in accordance with the enhancement signal MF and multiplies the linear derivative coefficient K1 by an enhancement level K2.

As shown in FIG. 5, the multiplier 27 performs multiplication by the enhancement level K2 "0 (zero)" in accordance with the enhancement signal MF indicative of "x 0 enhancement". In this case, no tone enhancement process is carried out. In the case of "x 1 enhancement", the multiplier 27 directly sends out the linear derivative coefficient K1. In the case of "x 2 enhancement", the multiplier 27 shifts the linear derivative coefficient K1 one bit upward. That is, the linear derivative coefficient K1 is multiplied by K2=2. In the case of "x 4 enhancement", the multiplier 27 shifts the linear derivative coefficient K1 two bits upward. That is, the linear derivative coefficient K1 is multiplied by K2=4.

Referring again to FIG. 2, the multiplier 27 supplies a limit signal LIM to the limiter 29 based on the multiplication result so that the limiter 29 outputs gradation data ED which has a positive value and a predetermined number of bits. For example, 8-bit gradation data ED (gradation data TD) has a value ranging from "0", to "255". The linear derivative coefficient K1 is the difference between the gradation data of the center pixel and the average of the gradation data of two pixels. Therefore, the subtracter 26 outputs the linear derivative coefficient K1, which has a positive or negative value. In this case, the limiter 29 may output the gradation data that has a number of bits greater than eight. To avoid this possibility, the limit signal LIM is supplied to the limiter 29.

When the gradation data ED having a positive value and a predetermined number of bits is output as shown in FIG. 4, for example, the multiplier 27 sends out the limit signal LIM "00" representing "no limit". When the gradation data ED having a positive value and a number of bits greater than the predetermined number is output, the multiplier 27 sends out the limit signal LIM "01" representing "FF limit" where "FF" is the maximum value (255) of eight bits, which is expressed in a hexadecimal notation. When the gradation data ED having a negative value is output, the multiplier 27 sends out the limit signal LIM "10" representing "0 limit"; "0" is the minimum value of eight bits.

Referring again to FIG. 2, the adder 28 receives the multiplication result supplied from the multiplier 27 and the gradation data D0 of the center pixel supplied from the register 22, and adds both together. The result of the addition is supplied to the limiter 29 as new gradation data of the center pixel in the above equation (2).

The limiter 29 receives the addition result from the adder 28 and the limit signal LIM from the multiplier 27, and performs a limit process on the addition result in accordance with the limit signal LIM. The processed addition result is supplied to the pixel quantity converter 12 as the gradation data ED.

As shown in FIG. 3, the pixel quantity converter 12 receives the gradation data ED that has undergone the tone enhancement process, the clock signal CLK (the same as the clock signal CLK in FIG. 2), a select clock signal CHS and an output select signal RES.

The select clock signal CHS is a pulse signal generated from the clock signal CLK and corresponding to the conversion ratio. The converter 12 outputs the average of the gradation data of two adjoining pixels as gradation data of a single pixel in response to the select clock signal CHS having a high (H) level. The converter 12 outputs the original pixel gradation data in response to the select clock signal CHS having a low (L) level.

Figure 7:
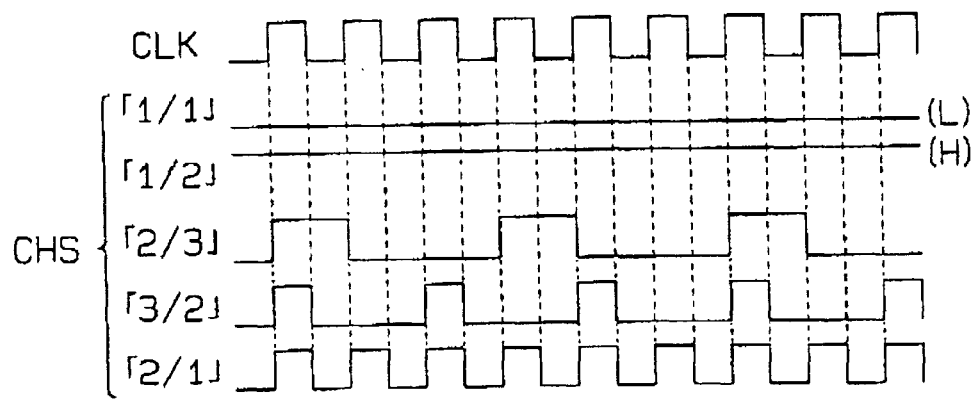
FIG. 7 is a waveform chart illustrating a clock signal and a select clock signal, which are supplied to the pixel quantity converter in FIG. 3.

As mentioned above, the conversion ratio is set to one of "1/1-fold", "1/2-fold", "2/3-fold", "3/2-fold" and "2/1-fold" as shown in FIGS. 10A–10E, In the case of "1/1-fold", the L-level select clock signal CHS, is always generated as shown in FIG. 7. In the cake of "1/2-fold", the H-level select clock signal CHS is always generated. In the case of "2/3-fold", the select clock signal CHS, which holds an L level during two of three periods of the clock signal CLK, is generated, In the case of "3/2-fold", the select clock signal CHS, which holds an L level during one and half periods in two periods of the clock signal CLK, is agenerated. In the case of "2/1-fold", the select clock signal CHS, which holds an L level during a half of one period of the clock signal CLK, is generated.

As shown in FIG. 6, the output select signal RES is set in accordance with the conversion ratio, For example, the output select signal RES is set to "000" for "1/1-fold", "001" for "1/2-fold", "010" for "2/3-fold", "011" for "3/2-fold" and "100" for "2/1-fold".

Referring again to FIG. 3, the pixel quantity converter 12 includes three registers 31, 32 and 33, two adders 34 and 35, two dividers 35 and 37 and three selectors 35, 39 and 40.

Each of the registers 31–33 is comprised of a multi bit-configured flip-flop circuit to store one pixel or gradation data. The registers 31–33, connected in series, sequentially receive the gradation data ED and hold three pixels of gradation data in response to the clock signal CLK. The register 31 outputs gradation data WR1, the register 32 outputs gradation data WR2, and the register 33 outputs gradation data WR3.

The adder 34 and the divider 36 form an average calculator circuit, which computes an average value AVE1 of the gradation data WR1 and WR2 of two adjacent pixels. The adder 35 and the divider 37 form another average calculator circuit, which computes an average value AVE2 of the gradation data WR2 and WR3 of two adjacent pixels.

The adder 34 receives the gradation data WR1 and WR2, adds both together, and supplies the added result to the divider 36. The divider 36 performs division to halve the added result and outputs the divisional result as the data AVE1. The adder 35 receives the gradation data WR2 and WR3, adds both together, and supplies the added result to the divider 37. The divider 37 performs division to halve the added result and outputs the divisional result as the data AVE2. Each of the dividers 36 and 37 uses a shift register, which shifts data of the addition result one bit toward lower bits to acquire a divislonal result.

The selector 38 raccives the data AVE1 and the gradation data WR2 from the register 32 and selects one of them in accordance with the select clock signal CHS. The selected one is sent as data SEL1. The selector 39 receives the data AVE2 and the gradation data WR2 from the register 32 and selects one of themn in accordance with the select clock signal CHS. The selected one is sent as data SEL2.

For example, the selectors 38 and 39 both select the gradation data WR2 in accordance with the L-level select clock signal CHS and output the selected gradation data WR2 as the signals SEL1 and SEL2, respectively. Those signals are output while the L-level select clock signal CHS is held.

The selector 40 receives the signals SEL1 and SEL2, supplied from the selectors 38 and 39 and the gradation data WR2 from the register 32 and selects one of them in accordance with the output select signal RES. The selected one is output as gradation data MD. As the output select signal RES is associated with the conversion ratio, the selector 40 selects one of the signals SEL1 and SEL2 and the gradation data WR2 in accordance with the conversion ratio. In other words, the selectors 38-40 select either the average of the gradation data of two adjacent pixels or the original pixel gradation data in accordance with the select clock signal CHS and the output select signal RES.

When the conversion ratio is "1/1-fold", as shown in FIG. 6, the selector 40 selects the gradation data WR2. That is, the selector 40 directly sends the gradation data ED, supplied to the pixel quantity converter 12, as the gradation data MD.

When the conversion ratio is "1/2-fold", the selector 40 selects the data SEL1, which is the data AVE1 or the average value selected by the selector 38 in accordance with the H-level select clock signal CHS. Therefore, the converter 12 replaces the gradation data ED of two pixels with the gradation data MD of one pixel.

When the conversion ratio is "2/3-fold", the selector 40 selects the data SEL1, which is the average value of the gradation data ED of two adjacent pixels or the gradation data WR2. Specifically, the selector 38 selects the gradation data WR2 for two periods of the clock signal CLK and selects the data AVE1 for one period of the clock signal CLK. Therefore, the converter 12 replaces the gradation data ED of three pixels with the gradation data MD of two pixels.

When the conversion ratio is "3/2-fold", the selector 40 selects the data SEL2, which is the average value of the gradation data of two adjacent pixels or the gradation data WR2. Specifically, the selector 39 selects the gradation data WR2 for one and a half periods of the clock signal CLK, and selects the data AVE2 for a half period of the clock signal CLK. Therefore, the converter 12 replaces the gradation data ED of two pixels with the gradation data MD of three pixels.

When the conversion ratio is "2/1-fold", the selector 40 selects the data SEL2, which is the average value of the gradation data of two adjacent pixel or the gradation data WR2. Specifically, the selector 39 selects the gradation data WR2 for a half period of the clock signal CLK and selects the data AVE2 for a half period of the clock signal CLK Therefore, the converter 12 replaces the gradation data of two pixels with the gradation data of four pixels.

Figure 11:
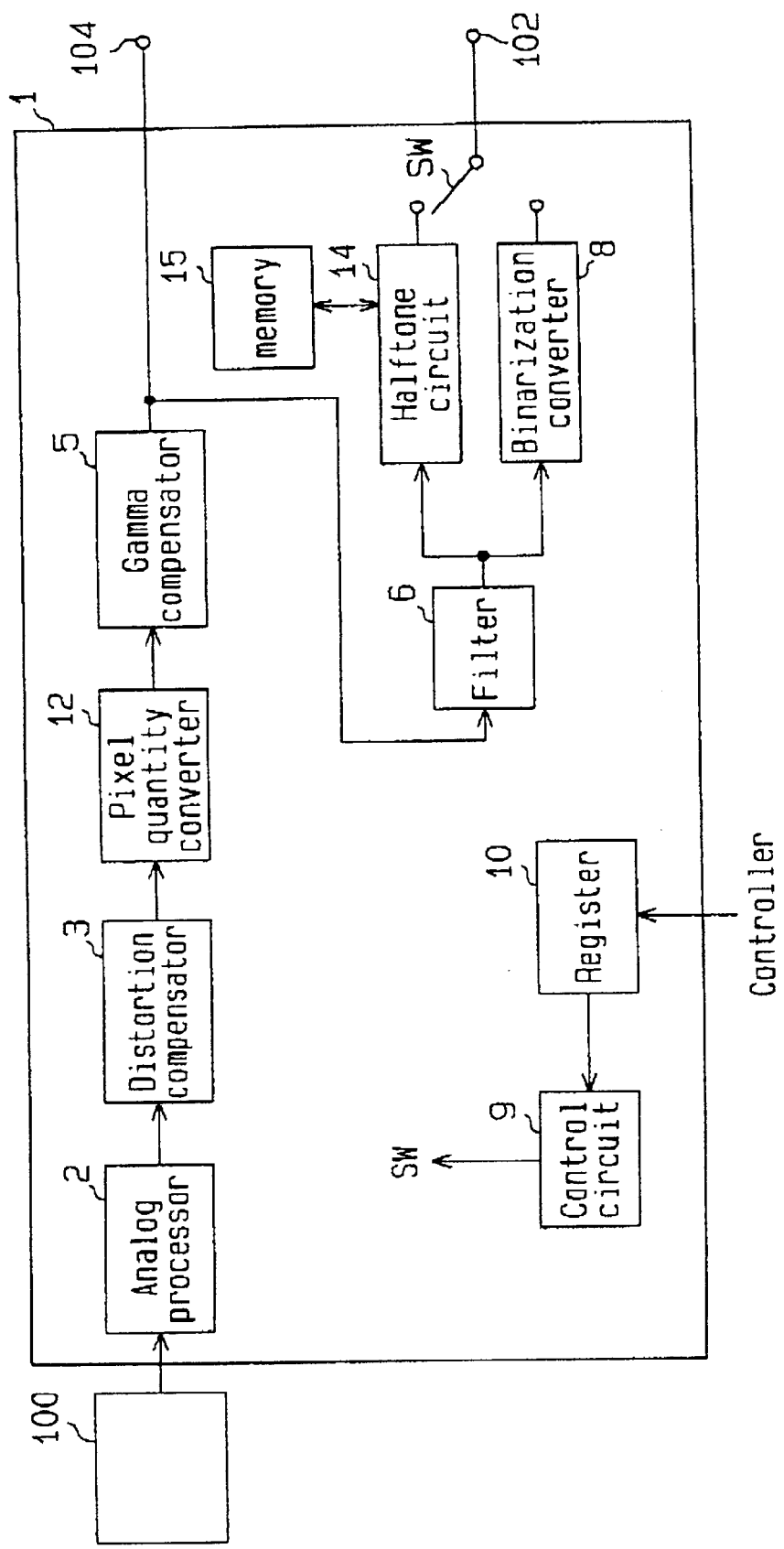
FIG. 11 is a block diagram illustrating an image data processing apparatus according to the second embodiment of the invention.

A second embodiment of the invention will now be described with reference to the accompanying drawings. To avoid redundancy, like or same reference numerals are given to those components that are like or the same as the corresponding components of the first embodiment. As shown in FIG. 11, the image data processing apparatus includes an analog processor 2, a distortion compensator 3, a pixel quantity converter 12, a gamma compensator 5, a filter 6, a binarization converter 8, a control circuit 9, a register 10, a halftone circuit 14 and a memory 15.

Figure 13:
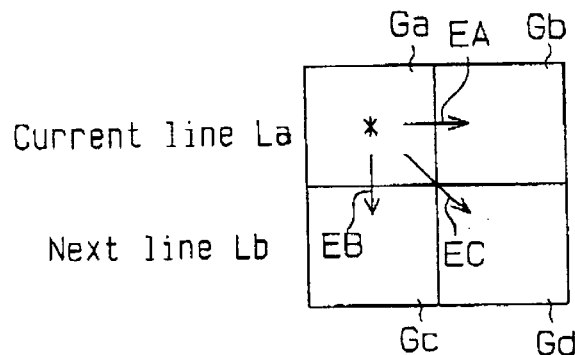
FIG. 13 is a diagram illustrating an error diffusion process, which is executed by the halftone circuit in FIG. 12.

An error diffusion process by the halftone circuit 14 will be discussed below. FIG. 13 shows an arbitrary pixel Ga in a current line La and a pixel Gb to be input next to the pixel Ga. FIG. 13 also shows a next line Lb to be input after the current line La, a pixel Gc in the next line Lb, which is adjacent to the pixel Ga, and a pixel Gd adjacent to the pixel Gb. The difference value, or error is value, between the arbitrary pixel Ga and a threshold value is distributed to-the pixels Gb, Cc and Gd. The ratio of error distribution to three pixels is previously set so that the total ratio becomes "1". For example, a half (error value data EA) of the error value is distributed to the pixel Gb, and a quarter (error value data EB, EC) of the error value is distributed to the pixels Gc and Gd. The error distribution ratio may be changed arbitrarily.

The halftone circuit 14 is configured that how to perforn an operation is changed in accordance with the conversion ratio in the pixel quantity converter 12. When the conversion ratio is equal to or smaller than "1", the halftone circuit 14 computes error value data for each pixel and stores the computed error value data into the memory 15. When the conversion ratio exceeds "1", the average of the error value data of two adjacent pixels is computed at the same time as error value data for each pixel the halftone circuit 14 is calculated, and the average data is stored in the memory 15.

Figure 14A:
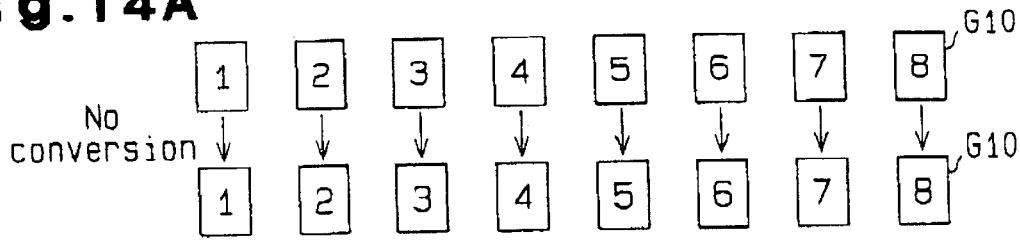
FIGS. 14A through 14E are diagrams illustrating the conversion process by the pixel quantity converter provided in the apparatus shown in FIG. 11.
Figure 14B:
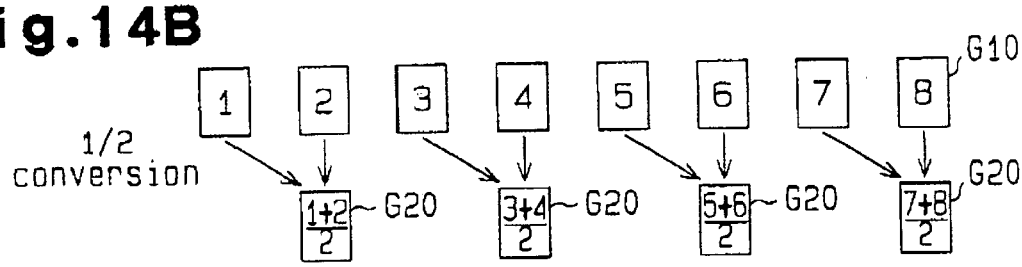
Figure 14C:
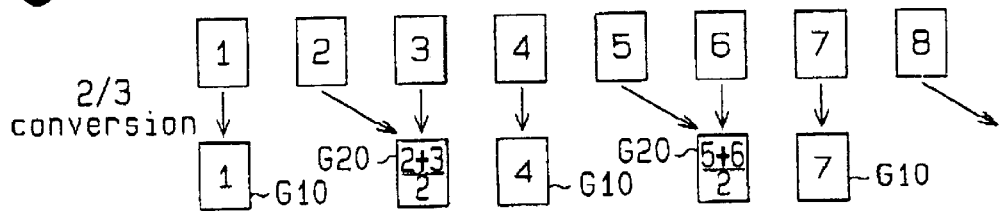
Figure 14D:
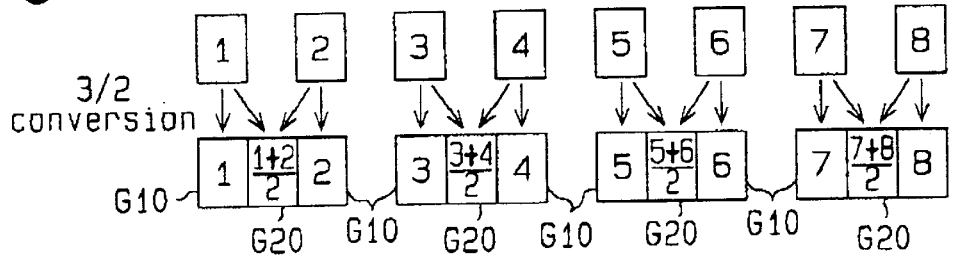

As shown in FIGS. 14A through 14E, a specific line (current line) after pixel quantity conversion consists of input gradation data G10 and new gradation data C20. Let us consider the case of "1/2 conversion" as one example of the conversion ratio being equal to or smaller than "1". In this case, the current line consists only of the new gradation data G20, as shown in FIG. 14B. The halftone circuit 14 computes error value data representing the difference between each new gradation data G20 and a threshold value, and stores each error value data in the memory 15.

Figure 15:
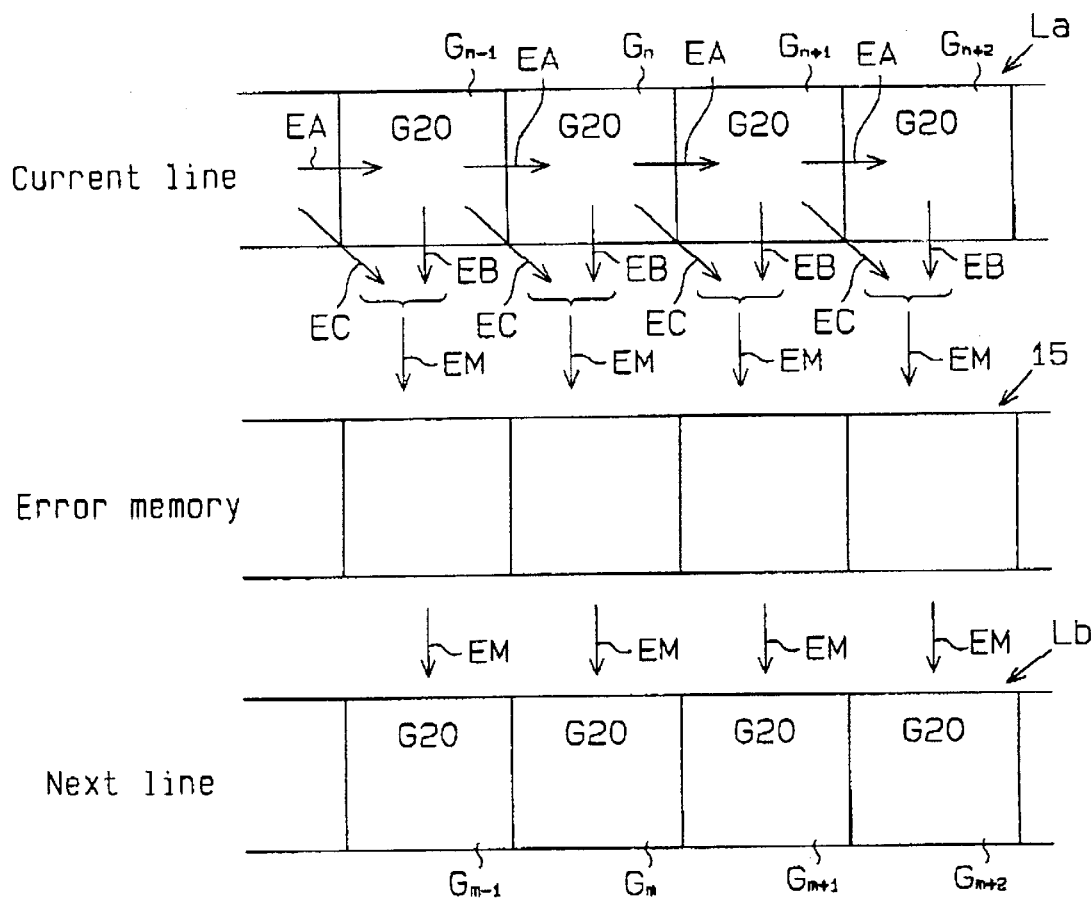
FIG. 15 is a diagram depicting an error diffusion process using a memory when the quantity conversion ratio is equal to or smaller than "1"

Let us pay attention to an arbitrary pixel Gn in the current line La as shown in FIG. 15. An error value between the gradation data of that pixel Gn and the threshold value is calculated. At this time, error value data EA of the pixel Gn−1, which is previous by one to the pixel Gn, is added to the gradation data of the pixel Gn. Further, error value data EA, EB and EC to be distributed are computed using the addition result. Furthermore, the error value data EB of the pixel Gn and the error value data EC of the pixel Gn−1 are added to the gradation data of a pixel Gn in the next line Lb, which is adjacent to the pixel Gn. Therefore, the halftone circuit 14 adds the error value data EC of the pixel Gn−1 to the error value data EB of the pixel Gn and stores the addition result in the memory 15 as error value data EM for the pixel Gm in the next line Lb.

With regard to a pixel Gn+1, the error value data EA of the pixel Gn is added to the gradation data of the pixel Gn+1, Then, the error value data EA, EB and EC to be distributed are computed using the addition result. The halftone circuit 14 adds the error value data EB of the pixel Gn+1 and the error value data EC of the pixel Gn together and stores the addition result in the memory 15 as the error value data Em for the pixel Gm+1 in the next line Lb.

When the arbitrary pixel Gn is the top pixel in one line, no pixel is present before that top pixel. Therefore, the halftone circuit 14 stores the error value data EB between the gradation data of the top pixel and the threshold value in the memory 15 as the error value data EM for the top pixel in the next line.

Figure 14E:
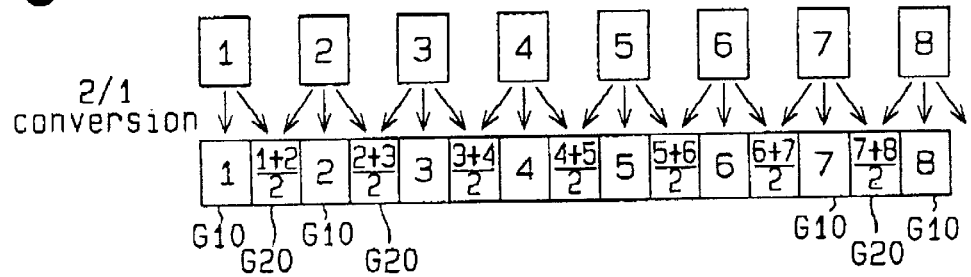

Let us now consider the case of "2/1 conversion" as an example of the conversion ratio exceeding "1". As shown in FIG. 14E, the current line is formed in such a way that input gradation data G10 and new gradation data G20 are arranged alternately. The halftone circuit 14 computes the error value data of the input gradation data G10 and the error value data of the new gradation data G20. The halftone circuit 14 also computes the average value of the error value data of the input gradation data G10 and the error value data of the new gradation data G20. This average value is stored in the memory 15 as the error value data of the input gradation data G10 and new gradation data G20.

Figure 16:
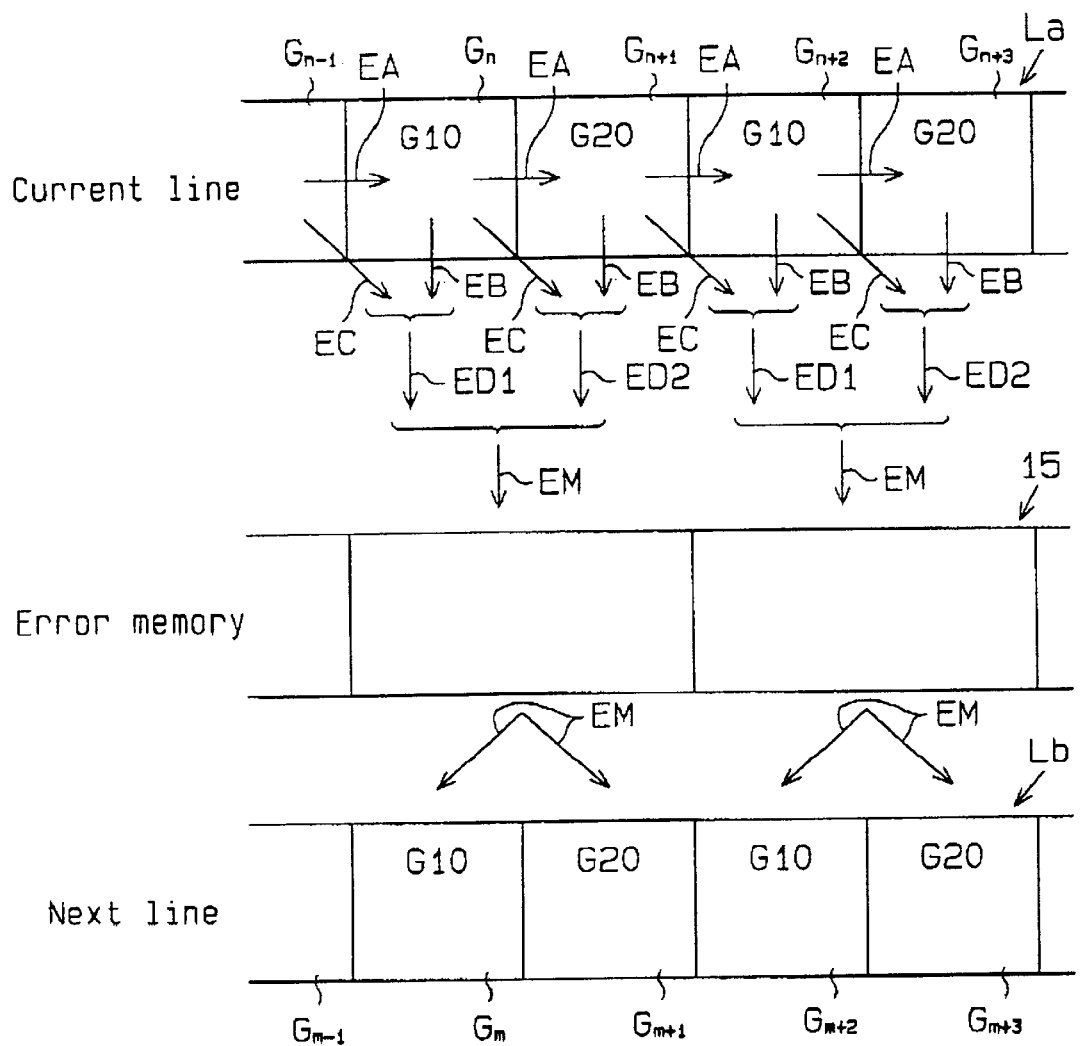
FIG. 16 is a diagram depicting the error diffusion process using the memory when the quantity conversion ratio is greater than "1".

Take an arbitrary pixel Gn corresponding to the input gradation data G10 in the current line La as shown in FIG. 16. An error value between the gradation data of that pixel Gn and a predetermined threshold value is calculated. At this time, error value data EA of the pixel Gn−1, previous by one to the pixel Gn, is added to the gradation data of the pixel Gn. Error value data EA, ED and EC to be distributed are computed using the addition result. The halftone circuit 14 adds the error value data EC of the pixel Gn−1 to the error value data EB of the pixel Gn to generate first error value data ED1, Subsequently, the halftone circuit 14 adds the error value data EC of the pixel Gn to the error value data EB of the pixel Gn+1 to generate second error value data ED2. The halftone circuit 14 further computes the average value of the first and second error value data ED1 and ED2 and stores that average value in the memory 15 as the error value data EM for the pixels Gm and Gm+1 in the next line Lb.

Likewise, the first error value data ED1 for a pixel Gn+2 and the second error value data ED2 for a pixel Gn+3 are computed. The halftone circuit 14 computes the average value of the first and second error value data ED1 and ED2 and stores that average value in the memory 15 as the error value data EM for the pixels Gm+2 and Gm+3 in the next line Lb.

When the conversion ratio is greater than "1", as apparent from the above, average error value data is stored in the memory 15. That is, error value data corresponding to a half of the number of pixels after conversion is stored in the memory 15. Therefore, the capacity of the memory 15 is prevented from becoming larger.

An image generated by adding the error value data EM to the input and new gradation data G10 and G20 in the next line Lb is substantially the same as an image generated by the normal error diffusion process. In the normal error diffusion process, the first and second error value data EM1 and EM2 are added to the input and new gradation data G10 and G20, respectively. Therefore, an image generated according to the second embodiment and an image generated by the normal error diffusion process appear the same to a user. The reason for the phenomenon is that the first error value data ED1 for the input gradation data G10 of the pixel Gn (Gn+2) is substantially equal to the second error value data ED2 for the new gradation data G20 of the pixel Gn+1 (Gn+3). This is based on the fact that the new gradation data G20 of the pixel Gn+1 (Gn+3) is the average of the input gradation data G10 of the two adjavcnt pixels Gn and Gn+2 (Gn+2, Gn+4) before conversion. In other words, the input and new gradation data G10 and G20 of the two adjacent pixels Gn and Gn+1 (Gn+2, Gn+3) after conversion are very similar to each other.

According to the second embodiment, as apparent from the above, the error value data of each pixel is stored when the conversion ratio is equal to or smaller than "1" and the average value of the error value data of adjoining pixels is stored when the conversion ratio is greater than "1". This scheme allows the execution of pixel quantity conversion process and error diffusion process while preventing the memory capacity from increasing.

In the error diffusion process in the second embodiment, the error value data of an arbitrary pixel may be distributed to a pixel in the next line and a pixel in the third line. The error value data of an arbitrary pixel may be distributed to next two pixels in the current line and three pixels in the next line. The average value of error value data may be stored in the memory 15 regardless of the pixel quantity conversion ratio.

Figure 12:
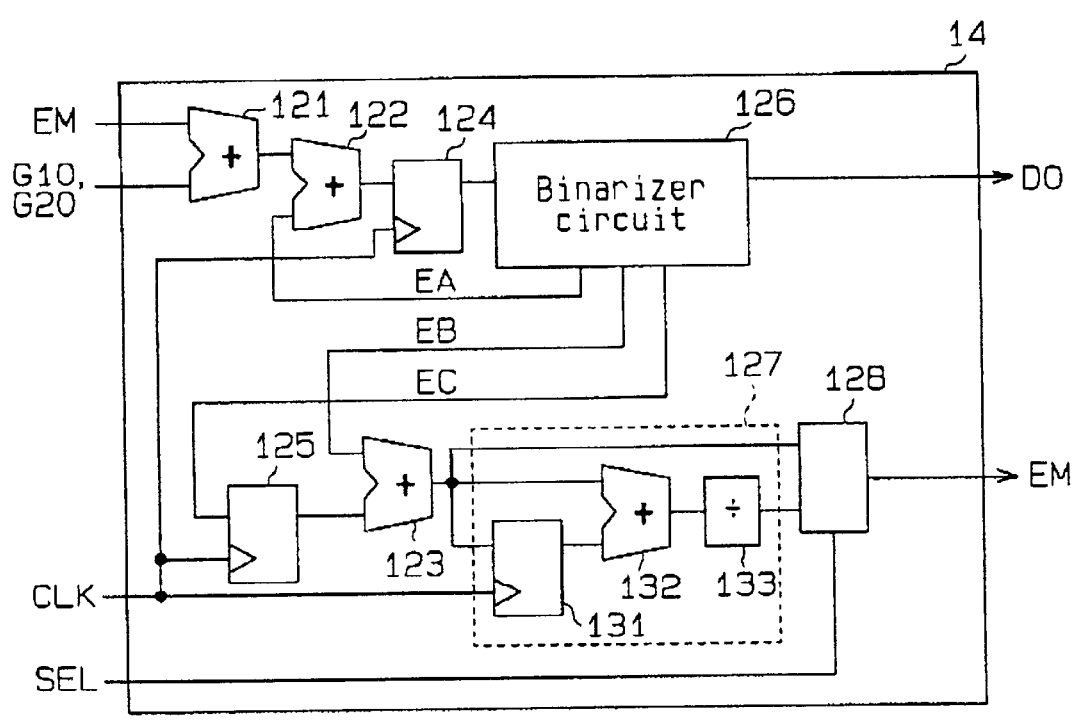
FIG. 12 is a block diagram showing a halftone circuit provided in the apparatus in FIG. 11.

The halftone circuit 14 will now be described specifically. As shown in FIG. 12, the halftone circuit 14 includes three adders 121, 122 and 123, two registers 124 and 125, a binarizer circuit 126, an averaging circuit 127 and a selector 128.

The adder 121 has a first input terminal for receiving the input gradation data G10 and new gradation data G20 which are alternately supplied, and a second input terminal for receiving the error value data EX in the previous line, stored in the memory 15. The adder 121 adds the input gradation data G10 or the new gradation data G20 and the error value data EM together and sends out the addition result to the adder 122.

The adder 122 has a first input terminal for receiving the addition result from the adder 121 and a second input terminal for receiving error value data EA generated by the binarizer circuit 126. The error value data EA is generated by using the input gradation data G10 of a pixel previous by one to the pixel whose input gradation data is currently input to the halftone circuit 14 or the new gradation data G20. The adder 122 adds the addition result from the adder 121 and the error value data EA together and sends the added result to the register 124.

The register 124 holds the addition result from the adder 122 for one clock period in accordance with the clock signal CLK, which has a pulse corresponding to the pixel input timing.

The binarizer circuit 126 compares a threshold value with the addition result from the register 124 or pixel gradation data to convert the gradation data to binary data DO. The binary data is supplied via the switch SW to the first output terminal 102 as the output of the image data processing apparatus 1.

The binarizer circuit 126 further generates error value data EA, EB and EC to which the difference between the gradation data of each pixel and the threshold value is distributed by a predetermined ratio. The error value data EA is supplied to the adder 122 so that the error value data EA of the current pixel (pixel Ga in FIG. 13) is added to the gradation data of the next pixel (pixel Gb in FIG. 13) in the same line. The error value data EB is supplied to the adder 123 so that the error value data EB of the current pixel is added to the gradation data of an associated pixel (pixel Gc in FIG. 13) in the next line. The error value data EC is supplied to the register 125. The error value data EC is what is distributed to a pixel right after the pixel Gc in the next line (pixel Gd in FIG. 5). The register 125 holds the error value data EC from the binarizer circuit 126 for one clock period in accordance with the clock signal CLK.

The adder 123 has a first input terminal for receiving the error value data EC output from the register 125 and a second input terminal for receiving the error value data EB from the binarizer circuit 126. The adder 123 adds both error value data EB and EC together and sends the result to the averaging circuit 127. This addition result is the error value data (EM in FIG. 15, ED1 or ED2 in FIG. 16) to be added to the gradation data of a pixel in the next line.

The averaging circuit 127 includes a register 131, an adder 132 and a divider 133. The register 131 receives error value data from the adder 123 and holds that error value data (e.g., the first error value data ED1) for one clock period in accordance with the clock signal CLK. The adder 132 has a first input terminal for receiving the error value data from the register 131 and a second input terminal for receiving the error value data (e.g., the second error value data ED2) from the adder 123. The adder 132 adds both error value data together and supplies the result to the divider 133. The divider 133 performs division to halve the addition result. As a result, the average value of the error value data of two adjacent pixels is generated. This average value is supplied to the selector 128.

The selector 128 receives the averaged error value data EM (see FIG. 16) from the averaging circuit 127 and the error value data from the adder 123 and selects one of them in accordance with a select data SEL, which represents the conversion quantity (conversion ratio). When the conversion ratio is equal to or smaller than "1", therefore, the averaged error value data EM is not selected, but the error value data from the adder 123 is selected and supplied to the memory 15.

The memory 15 stores the error value data EM from the averaging circuit 127 in accordance with a write enable signal, the period of which is double the period of the clock signal CLK. Such processing is accomplished in order to halve the number of pieces of error value data EM generated for each period of the clock signal CLK. The number of pieces of error value data EM generated by the divider 133 is actually equal to the number of pieces of the error value data ED1 or ED2. The use of the write enable signal having a period twice as long as that of the clock signal CLK permits half the number of pieces of error value data EM to be stored in the memory 15. That is, the number of pieces of error value data EM is reduced to half the number of pieces of the first or second error value data.

Although two embodiments of the present invention have been described herein, it should be apparent to those skilled in the art that the present invention may be embodied in many other specific forms without departing from the spirit or scope of the invention. Therefore, the present examples and embodiments are to be considered as illustrative and not restrictive and the invention is not to be limited to the details given herein, but may be modified within the scope and equivalence of the appended claims.

What is claimed is:

1. An apparatus for processing image data corresponding to one screen, said image data consisting of a plurality of lines, each including plural pieces of consecutive analog element data, said apparatus comprising:

an analog processor for quantizing each of said analog element data to generate multiple-state element data;

a quantity converter for successively receiving plural pieces of said multiple-state element data from said analog processor and changing the number of plural pieces of multiple-state element data in one line to generate quantity-converted element data, wherein said quantity converter includes at least three series-connected resisters for successively temporarily storing said plural pieces of multiple-state element data, at least two averaging circuits, connected to said at least three registers, each averaging circuit receiving at least two adjacent pieces of multiple-state element data from the associated two registers and computing an average value of said at least two adjacent pieces of multiple-state element data to generate one piece of new multiple-state element data, at least two first selector circuits, connected to one of said at least three registers and respectively connected to said at least two averaging circuits, each first selector circuit receiving said original multiple-state element data from said one register and said one piece of new multiple-state element data from said associated averaging circuit, said each first selector circuit selectively outputting said one piece of new multiple-state element data and said original multiple-state element data in accordance with a predetermined first select clock, and a second selector circuit, connected to one of said at least three registers and at least two first selector circuits, for receiving said original multiple-state element data from said one register and at least two pieces of new multiple-state element data from said at least two first selector circuits, said second selector selectively outputting said at least two pieces of new multiple-state element data and said original multiple-state element data as said quantity-converted element data in accordance with a predetermined second select clock; and a binarization converter for receiving said quantity-converted element data and binarizing said quantity-converted element data to generate binary element data.

2. An apparatus for processing image data corresponding to one screen, said image data consisting of a plurality of lines, each including plural pieces of consecutive analog element data, said apparatus comprising:

an analog processor for quantizing each of said analog element data to generate multiple-state element data;

a tone enhancer for successively receiving plural pieces of multiple-state element data from said analog processor and enhancing a tone between plural pieces of multiple-state element data in one line, said tone enhancer computing a difference between specific multiple-state element data in one line and at least one multiple-state element data adjacent to said specific multiple-state element data, said tone enhancer further adding said difference to said specific multiple-state element data to generate tone-enhanced element data;

a quantity converter for successively receiving plural pieces of tone-enhanced element data from said tone enhancer and changing the number of plural pieces of tone-enhanced element data in one line to generate quantity-converted element data, said quantity converter averaging at least two adjacent pieces of tone-enhanced element data to generate an average value as one piece of new multiple-state element data, said quantity converter further selectively outputting said new multiple-state element data and original tone-enhanced element data as said quantity-converted element data; and a binarization converter for receiving said quantity-converted element data and binarizing said quantity-converted element data to generate binary element data.

3. The apparatus according to claim 2, wherein said tone enhancer includes:

a plurality of registers for successively receiving at least two adjacent pieces of multiple-state element data from said analog processor and temporarily storing said at least two adjacent pieces of multiple-state element data;

a subtracter, connected to .said plurality of registers, for receiving said at least two adjacent pieces of multiple-state element data from associated registers and computes a difference between specific multiple-state element data and multiple-state element data adjacent to said specific multiple-state element data;

a multiplier, connected to said subtracter, for receiving said difference from said subtracter, multiplying said difference by a predetermined enhancement level and outputting an enhanced difference value; and an adder, connected to that register where said specific multiple-state element data is stored and said multiplier, for receiving said specific multiple-state element data and said enhanced difference from said register and said multiplier respectively, said adder adding said enhanced difference to said specific multiple-state element data and outputting said tone-enhanced element data.

4. The apparatus according to claim 2, wherein said quantity converter includes:

a plurality of serles-connected registers for successively receiving plural pieces of tone-enhanced element data and temporarily storing said plural pieces of tone-enhanced element data;

an averaging circuit, connected to said plurality of registers, for receiving at least two adjacent tone-enhanced element data from the associated registers and averaging said at least two adjacent tone-enhanced element data to generate an average value as one piece of new multiple-state element data; and a selector circuit, connected to one of said plurality of registers and said averaging circuit, for receiving said original tone-enhanced element data and said new piece of multiple-state element data from said one register and said averaging circuit respectively, said selector circuit selectively outputting said new piece of multiple-state element data and said original tone-enhanced element data as said quantity-converted element data in accordance with a predetermined select clock.

5. An apparatus for processing image data corresponding one screen, said image data consisting of a plurality of lines, each including plural pieces of consecutive analog element data, said apparatus comprising:

an analog processor for quantizing each of said analog element data to generate multiple-state element data;

a quantity converter for successively receiving plural pieces of said multiple-state element data from said analog processor and changing the number of plural pieces of multiple-state element data in one line to generate quantity-converted element data, wherein said quantity converter includes at least three series-connected registers for successively temporarily storing said plural pieces of multiple-state element data, at least two averaging circuits, connected to said at least three registers; each averaging circuit receiving at least two adjacent pieces of multiple-state element data from the associated two registers and computing an average value of said at least two adjacent pieces of multiple-state element data to generate one piece of new multiple-state element data, at least two first selector circuits, connected to one of said at least three registers and respectively connected to said at least two averaging circuits, each first selector circuit receiving said original multiple-state element data from said one register and said one piece of new multiple-state element data from said associated averaging circuit, said each first selector circuit selectively outputting said one piece of new multiple-state element data and said original multiple-state element data in accordance with a predetermined first select clock, and a second selector circuit, connected to one of said at least three registers and at least two first selector circuits, for receiving said original multiple-state element data from said one register and at least two pieces of new multiple-state element data from said at least two first selector circuits, said second selector selectively outputting said at least two pieces of new multiple-state element data and said original multiple-state element data as said quantity-converted element data in accordance with a predetermined second select clock;

a halftone circuit for successively receiving plural pieces of quantity-converted element data and computing an error value between each of said plural pieces of quantity-converted element data in a current line and a first predetermined threshold value said halftone circuit averaging error values for at least two adjacent pieces of quantity-converted element data to generate an average error value; and a memory, connected to said halftone circuit, for receiving said average error value as an error value for one piece of quantity-converted element data and storing said average error value in a line by line manner, wherein said halftone circuit adds said average error value stored in said memory to at least one associated piece of quantity-converted element data in a next line to generate an addition result, said halftone circuit further comparing the addition result with a second predetermined threshold value to generate binary element data.

6. The apparatus according to claim 5, wherein said halftone circuit includes:

a first adder, connected to said quantity converter and said memory, for receiving first quantity-converted element data in a current line from said quantity converter and receiving an associated average error value in a previous line for said current line from said memory, said first adder adding said associated average error value to said first quantity-converted element data to output a first addition result;

a second adder, connected to said first adder, for receiving said first addition result from said first adder and adding a first error value to said first addition result to output a second addition result, said first error value being an error value for second quantity-converted element data previous by one to said first quantity-converted element data in said current line;

a register, connected to said second adder, for receiving said second addition result from said second adder and temporarily holding said second addition result until next new second addition result is output from said second adder;

a binarizer circuit, connected to said register and second adder, for receiving said second addition result from said regiuter and comparing said second addition result with said second presdtermined threshold value to generate binary element data, said binarizer circuit generating said first error value and providing said first error value to said second adder, said binarizer circuit further generating a second error value, said second error value being an error value to be added to an associated piece of quantity-converted element data in said next line; and an averaging circuit, connected to said binarizer circuit, for receiving two consecutive second error values from said binarizer circuit and averaging both of said second error values to yield an average error value.

7. The apparatus according to claim 6, wherein said binarizer circuit generates second and third error values, both second and third error values being error values to be added to two associated pieces of quantity-converted element data in said next line; and wherein said halftone circuit further includes:

a register, connected to said binarizer circuit, for receiving said second error value from said binarizer circuit and temporarily storing said second error value; and a third adder, connected between said register, said binarizer circuit and said averaging circuit, for respectively receiving said second and third error values from said register and said binarizer circuit and adding said second and third error-values together to generate a fourth error value, wherein said averaging circuit receives two consecutive fourth error values from said third adder and averages both of said fourth error values to generate an average error value.

* * * * *